(12) United States Patent
Patil et al.

(10) Patent No.: US 9,577,984 B2
(45) Date of Patent: Feb. 21, 2017

(54) NETWORK INITIATED ALERTS TO DEVICES USING A LOCAL CONNECTION

(75) Inventors: Basavaraj Patil, Coppell, TX (US); Gabor Bajko, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 120 days.

(21) Appl. No.: 13/204,175

(22) Filed: Aug. 5, 2011

(65) Prior Publication Data
US 2012/0036271 A1    Feb. 9, 2012

Related U.S. Application Data

(60) Provisional application No. 61/371,269, filed on Aug. 6, 2010.

(51) Int. Cl.
| | |
|---|---|
| *G06F 15/16* | (2006.01) |
| *H04L 29/06* | (2006.01) |
| *H04W 76/02* | (2009.01) |
| *H04W 4/20* | (2009.01) |
| *H04W 36/14* | (2009.01) |

(52) U.S. Cl.
CPC ........ *H04L 63/0272* (2013.01); *H04W 76/022* (2013.01); *H04W 4/20* (2013.01); *H04W 36/14* (2013.01)

(58) Field of Classification Search
CPC ...... H04W 12/08; H04W 8/245; H04W 48/08; H04W 76/022; H04W 80/04; H04W 88/08; H04W 76/02; H04W 92/02; H04W 76/00; H04W 8/26; H04W 36/0011; H04W 88/06; H04W 40/36; H04L 63/18; H04L 63/0272; H04L 45/741; H04L 61/2015; H04L 9/3215; H04L 12/1895; H04L 12/2834; H04L 65/4076; H04L 12/2424; H04L 12/2854; H04L 12/2856; H04L 29/12216; H04L 29/12367
USPC ............ 709/222, 227, 228, 229; 726/3, 4, 6; 455/411, 436; 370/252, 254, 331, 338
See application file for complete search history.

(56) References Cited

U.S. PATENT DOCUMENTS

| | | | | |
|---|---|---|---|---|
| 2002/0046348 A1* | 4/2002 | Brustoloni | ........ | H04L 29/12367 726/6 |
| 2004/0052216 A1* | 3/2004 | Roh | ..................... | H04L 12/2856 370/252 |
| 2004/0235455 A1* | 11/2004 | Jiang | ...................... | G01V 3/087 455/411 |

(Continued)

FOREIGN PATENT DOCUMENTS

| | | |
|---|---|---|
| CN | 101356770 A | 1/2009 |
| WO | WO 2007/058981 A2 | 5/2007 |
| WO | WO 2010/057120 A2 | 5/2010 |

*Primary Examiner* — Dustin Nguyen
*Assistant Examiner* — Hao Nguyen
(74) *Attorney, Agent, or Firm* — Harrington & Smith

(57) ABSTRACT

Systems and techniques for managing local communication between a network access point and a host device. Upon connection by a host device to an access point, a local connection link is established between the access point and the host device. A network connection may be established between the access point and the host device, with the network connection being able to pass through the host device to enable communication with and beyond an access network to which the access point provides a connection. Local messages may be passed between the access point and the host device over the local connection link, separately from and independent of communication that may occur over the network connection.

20 Claims, 5 Drawing Sheets

(56) References Cited

U.S. PATENT DOCUMENTS

| | | |
|---|---|---|
| 2005/0152287 A1* | 7/2005 | Yokomitsu et al. .......... 370/255 |
| 2006/0046728 A1 | 3/2006 | Jung et al. |
| 2006/0218296 A1* | 9/2006 | Sumner ............. H04L 29/12066 709/238 |
| 2006/0236378 A1* | 10/2006 | Burshan ........................... 726/4 |
| 2006/0251021 A1* | 11/2006 | Nakano et al. ............... 370/331 |
| 2006/0256750 A1* | 11/2006 | Van Bemmel ................ 370/331 |
| 2006/0256788 A1* | 11/2006 | Donahue ....................... 370/389 |
| 2007/0091875 A1* | 4/2007 | Rahman ........................ 370/352 |
| 2009/0016529 A1* | 1/2009 | Gopinath et al. ............. 380/270 |
| 2009/0097453 A1* | 4/2009 | Weniger ................ H04W 8/087 370/331 |
| 2009/0097459 A1 | 4/2009 | Jendbro et al. |
| 2009/0219832 A1* | 9/2009 | Velev ................ H04W 36/0011 370/254 |
| 2009/0274094 A1* | 11/2009 | Engwer ......................... 370/328 |
| 2009/0276314 A1 | 11/2009 | Gorodyansky et al. |
| 2011/0010437 A1* | 1/2011 | Christenson ............ H04L 12/00 709/222 |
| 2011/0022651 A1* | 1/2011 | Hwang ............. H04N 21/6402 709/201 |

\* cited by examiner

NETWORK INITIATED ALERTS TO DEVICES USING A LOCAL CONNECTION

CROSS-REFERENCE TO RELATED APPLICATIONS

This application claims priority from U.S. Provisional Patent Application No. 61/371,269, filed on Aug. 6, 2010, which is hereby incorporated herein by reference in its entirety.

TECHNICAL FIELD

The exemplary and non-limiting embodiments of this invention relate generally to wireless local communication links, such as for example a local link over a wireless LAN, and to related methods, devices and tangibly embodied computer program software.

BACKGROUND

The following abbreviations that may be found in the specification and/or the drawing figures are defined as follows:
AP access point
ARP address resolution protocol
DHCP dynamic host configuration protocol
IANA Internet assigned names authority
IEEE Institute for Electrical and Electronics Engineers
IP internet protocol
IPsec internet protocol—secure
NAT network address translation
SIG special interest group
SCTP stream control transmission protocol
SP service provider
TCP transmission control protocol
UDP user datagram protocol
VPN virtual private network
UE user equipment
WFA Wi-Fi Alliance®
Wi-Fi name for IEEE 802.11x networks
WLAN wireless local access network One priority issue for the IEEE 802.11 SIG is to allow a wireless networking hotspot to "push" information, that is, to send unsolicited information such as, for example, notifications or advertisements, to devices connected to the hotspot. For example, a notification could be sent to warn users of individual connected devices that the time authorized for connectivity is nearing expiration. In one common practice, a user is directed to a captive portal when first attaching to a public hotspot (for example, at an airport). The captive portal may present the user with one or more options for Internet access, such as payment for a defined time period or acceptance of conditions for free access, and wireless network operators grant access, whether paid or free, only for a defined time period after which additional payment or renewal of acceptance of conditions may be required. Once the user has fulfilled the conditions for access, the Wi-Fi network operator opens the gates for Internet access for the user for the duration of the specified time period. Notifications contemplated above would enable the user to meet conditions for continued access, such as purchasing additional access time, prior to expiration of the current session.

Enterprise users in public locations often access a hotspot to set up a VPN connection with a secure server. The user starts the VPN client and thereby establishes an IPsec tunnel between the user's host device and the VPN gateway in the enterprise network. The VPN client in the host device creates a virtual interface and all the traffic to the host device uses the IPsec tunnel and the VPN interface. Traffic through the tunnel is encrypted (IPsec ESP tunnel mode) and hence therefore secure. Despite the fact that the secure VPN tunnel passes through the hotspot itself, the hotspot is itself unable to inject into the secure VPN link a message to warn the host device that its network access time is about to expire. There is an increasing use of VPNs for various reasons that go beyond enterprise connectivity.

The Wi-Fi Alliance (WFA) has initiated a new activity, Hotspot 2.0, aimed at specifying a behavior for the 802.11 access points and clients to enable the above noted notifications. Specifically, there are to be options for auto-renew and for push notifications which the WFA requirements document characterizes as follows:

Auto Renew: When an end-user with a limited Wi-Fi plan (e.g. time-based) is in a session in a Hotspot, and when the plan is about to expire, the end user receives a notification on his or her device that the current session is about to expire. The user need not have the web browser opened. The notification provides the ability to the end user to extend the session and need not require the end-user to re-enter the permanent or temporary credentials (e.g. credit card).

Push notifications: Generic interface for notifications may also be used for other purposes defined by the SP (information on subscription, marketing info, push of services advertisements, etc).

Auto renew messages and push notifications might traditionally be sent using a split VPN, in which the selectors in the client on the host device are configured in such a way that only a limited set of applications use the IPSec VPN tunnel and so the auto-renew and push notifications can be sent outside that limited set. But this approach opens a potential security vulnerability, and hence many enterprise networks do not allow split VPNs, which typically cannot be overridden at the host device. For this reason the WFA has stipulated that at least the auto renew function is to operate even when split tunneling is disabled.

What is needed in the art is a way for an access point or other node of an access network to send the above contemplated messages to a user device regardless of whether that user device is connected as host to a secure VPN.

SUMMARY OF THE INVENTION

In a first embodiment of the invention, a method comprises establishing a local communication link between a host device and a node of an access network using addresses for the host device and for the node of the access network that are associated with the local communication link, establishing a network communication link passing from the host device and through the access network using addresses for the host device and for the node of the access network that are associated with a network communication link passing through the access network and communicating a message between the host device and the node over the local communication link, wherein communicating the message between the host device and the node is independent of the network communication link.

In a second embodiment of the invention, an apparatus comprises at least one processor and at least one memory storing computer program code. The memory and the computer program code are configured to, with the processor, cause the apparatus to establish a local connection link to an access node of an access network using addresses for the apparatus and for the access node that are associated with the local connection link, establish a secure connection link passing from the apparatus and through the access network using addresses for the host device and for the node of the access network that are associated with a network communication link passing through the access network, and receive a message from the node over the local communication link. Communicating the message between the host device and the node is independent of the secure communication link.

In a third embodiment of the invention, a computer readable medium storing a program of instructions. Execution of the instructions by a processor causes an apparatus to perform actions comprising establishing a local communication link between a host device and a node of an access network using addresses for the host device and for the node of the access network that are associated with the local communication link, establishing a network communication link passing from the host device and through the access network using addresses for the host device and for the node of the access network that are associated with the network communication link passing through the access network, and communicating a message between the host device and the node over the local communication link, wherein communicating the message between the host device and the node is independent of the network communication link.

DETAILED DESCRIPTION

Figure 1:
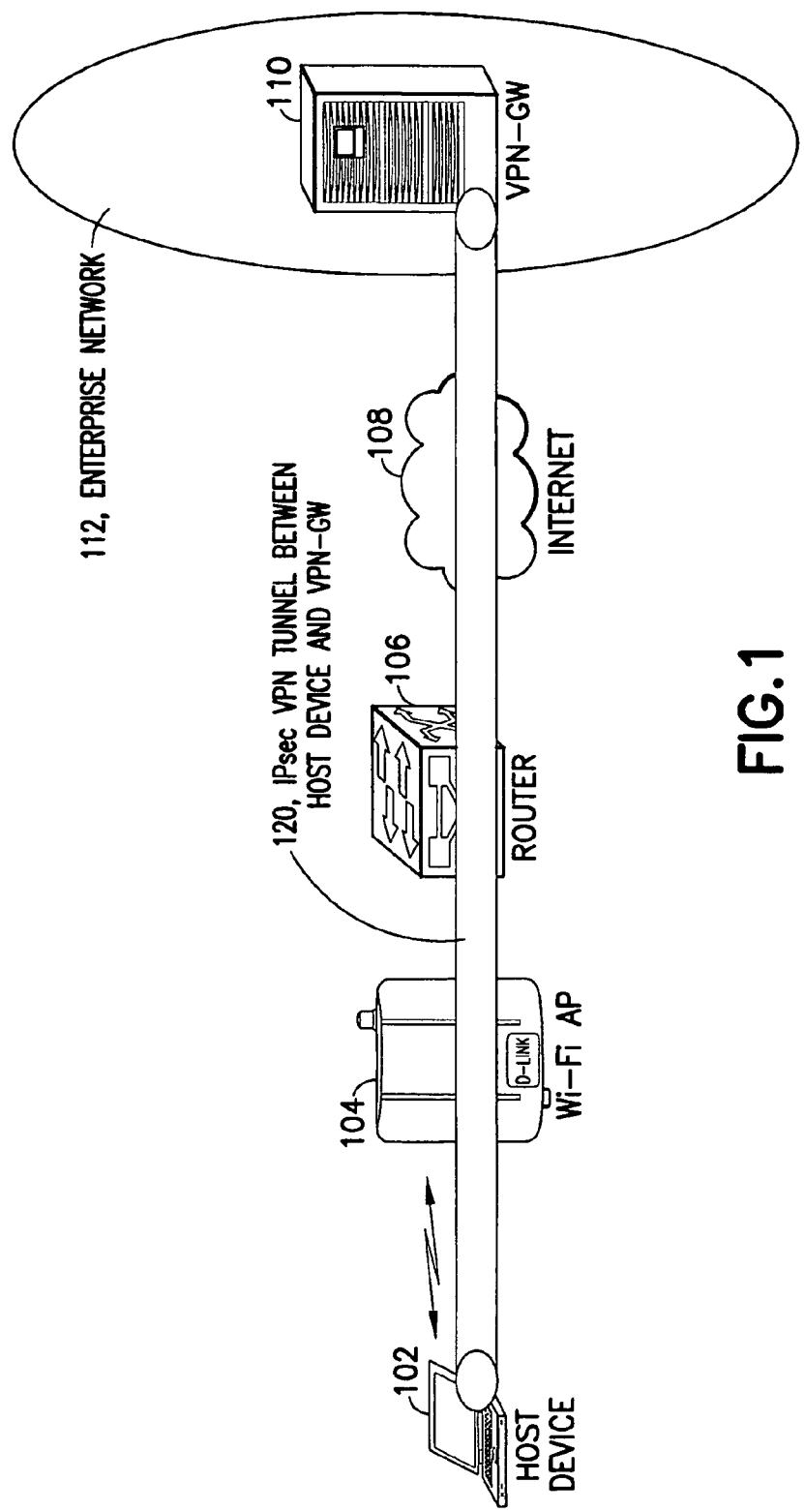
FIG. 1 is a schematic representation of an exemplary but non-limiting environment in which embodiments of the invention may be practiced in which there is a VPN between a host device and a VPN-GW which further passes through a Wi-Fi AP, a separate router and the Internet.

Exemplary embodiments of the invention solve at least the above problem of delivering administrative messages to a user device even in the presence of VPN connectivity by establishing a local communication link (a transport layer connection) between the user device and a node of an access network regardless of any IPsec connection with the user device. The messages, which may for example be a timeout message or an advertisement, may then be sent on the local communication link to the user device using at least one port designated for the local communication link. By way of example, the user device may be a portable user equipment, and the node of the access network may be a router or server which may or may not be co-located with the Wi-Fi hotspot access point itself. While the specific examples below employ a Wi-Fi/WLAN network as the access network, this is exemplary only and non-limiting to the broader teachings herein.

In exemplary but non-limiting embodiments, there may be a VPN connection simultaneous to the local communication link which uses transport (link-local) addresses. Even if that VPN link is a split VPN tunnel, the above referenced messages are not sent on the VPN link itself. Rather, they are sent to the user device on the local link and so are not dependent on specific security policies implemented at the user device according to the VPN administrator requirements. In the case of split VPN tunnels, some messages may additionally be sent on the insecure portion of the split VPN tunnel. Exemplary embodiments of this invention used in conjunction with a split tunnel VPN may therefore represent a second means by which an administrative message may be sent to the user device.

Below are detailed three exemplary but non-limiting categories of embodiments to implement the general concept described above.

In a first exemplary category of embodiments this local link is a transport layer connection, such as TCP, UPD, SCTP, or the like, with the connection using link-local IP addresses. The designated port is on the Wi-Fi AP or first hop router/server. The host device learns the identity of the port that the server is using on its local link for the notification delivery through an appropriate mechanism. Examples of such mechanisms include layer 2 signaling or DHCP, the use of a default port that is known a priori, or the use of address resolution protocol (ARP) or Neighbor Discovery. Once the identity of the port is known, the host device sets up a transport layer connection to that designated server port in order to receive notifications from the server.

In a second exemplary category of embodiments the host device designates one of its own ports on its local link and sets up a listening socket for receiving notifications. The host device informs the Wi-Fi AP or router/server of that designated port, for example, via layer 2 signaling, ARP or Neighbor Discovery, DHCP, or the use of a default port that the server knows a priori. The host device sets up a listening socket on that designated port, and receives messages addressed from the link-local address of the server that arrive at that designated port. In various embodiments falling within this second exemplary category, the messages received at the host device may be over a transport connection established expressly for this purpose. A transport connection may be, for example, a TCP, UDP, or SCTP connection or the like)

In a third exemplary category of embodiments the AP assigns to the user device an IP address. The user device in response either designates one of its own ports as a listening port as in the second embodiment above, or the server informs the user device which server port is to be used for the local communication link as in the first category above (or DHCP or a default port may be used). But in this third category there is no link-local address associated with the designated port. Instead, the relevant globally routable IP address is associated with the port. Such an approach is particularly useful for host devices that are not VPN capable, since the IP address in that instance cannot be used for a VPN connection due to the user device's lack of capability. Using the IP address for the local communication link avoids the need for a possible address translation between IP address and a different link-local address.

Before delving into implementation details for these three non-limiting categories of embodiments, first is detailed a networked environment in which various embodiments falling within these categories may be put into practice to avoid any ambiguity in terminology used herein. By way of example but not by way of limitation, the Wi-Fi hotspot of FIG. 1 is operating in a public location such as for example an airport or an Internet café. An end user is represented by a host device 102. The host device 102 is here illustrated as a laptop computer but may be any suitable device, such as a cellular telephony handset, Internet tablet, or other such portable radio device. The Wi-Fi hotspot 104 is embodied as an AP and also shown is a router 106. As noted above, the router 106 may be co-located with the AP 104 but is shown separately for clarity. The local link, a first end of which terminates at the host device 102, may pass through the AP 104 and terminate at an opposed second end at the router 106 if the AP 104 and router 106 are not co-located, or at the AP 104 if the AP 104 and router 106 are co-located. The AP 104 and/or router 106 may also have functionality of a server to which an IP or a transport address (as the case may be for different embodiments) for the local link is assigned and so in general terms the opposed second end of the local link may be considered to terminate at a node of the access network.

Further shown at FIG. 1 is the Internet 108, within which it is understood the router 106 and/or the VPN gateway 110 may be considered to lie. Illustration of the Internet 108 is to show there may be further intermediate nodes between the router 106 and the VPN-GW 110. The VPN-GW 110 is the portal through which access to the enterprise network 112 is granted, and the VPN-GW 110 is termed more generally as a secure server since it assures only authorized parties/devices are given access to the enterprise network 112. There may be a separate authentication server (not shown) in communication with the VPN-GW 110 to aid in that purpose. In conventional VPN terminology and as used herein, the host device 102 is in the position of the VPN host and runs a VPN client which is the computer software program that initiates the VPN connection or tunnel.

There is also shown at FIG. 1 a VPN tunnel 120 with terminal ends at the host device 102 and the VPN-GW 110. The VPN tunnel 120 always runs through at least the AP 104 of the access network, and may or may not run though the node which is the network-side end of the local communication link for the case in which that node is not co-located with the AP 104. Conventionally, since data on the VPN 120 is securely encrypted there is no way for the AP 104 or router 106 to inject its own messages into the VPN 120 tunnel itself; the split VPN tunnel option noted above is not really injecting messages into the secure portion of the VPN 120 but instead represents a parallel tunnel, apart from the one carrying the encrypted data, which non-enterprise nodes such as the AP 104 and router 106 are able to use for their own messages. As noted above the, WFA prefers a solution for timeout warning messages and push notifications that do not rely on the availability of split VPN tunneling.

Link-local addresses have been defined for IPv4 and IPv6, and link-local addresses have been specified at least as early as IPv4. By way of example, the IPv4 prefix 169.254/16 is registered with IANA for link-local addresses and is assigned to a network interface. Link-local addresses in the context of IPv6 are also explicitly specified and well understood. Since the general nature of link-local addresses is widely known in the wireless communication arts such addresses are not further detailed herein, understanding that specifics concerning how link-local addresses are defined may be modified in later versions of IP specifications without departing from these teachings.

Unlike generic IP addresses which are globally routable, use of the link-local address is limited to the local communication link between the host device 102 and the Wi-Fi network. At FIG. 1 such a network is embodied as the Wi-Fi AP 104 and the router 106 which may be co-located with the AP 104. IP communications from the Wi-Fi network to the host device 102 on the local link can use the link-local address of the host device 102 as the destination address.

Now are detailed further the three exemplary but non-limiting categories of embodiments which were summarized above. In the first exemplary category of embodiments, the access network assigns the link-local address to the host device 102, using, for example, the AP 104 or the router 106 to carry out the assignment. The access network ensures that the link-local address is unique for each host attached to that shared link. Uniqueness may be ensured, for example, by performing duplicate address detection (DAD). In the descriptions below, for simplicity the termination of the local link is described generically as being at a server 104-106, which may be the AP 104, the router 106, or some server 105 in the access network separate from the AP 104 or router 106. It will be recognized that two or more of the AP 104, router 106, and server 105 may be combined as a single unit, and it will also be recognized not all of the exemplary devices 104-106 presented here are required and that other devices may be used to perform the functions described herein without detracting from the invention.

An exemplary embodiment falling within the first category may suitably be implemented as follows. When the host device 102 has obtained network access via the Wi-Fi hotspot/AP 102 for some defined duration of time, the administrator of the Wi-Fi hotspot tracks the lifetime of the connection. A timer is initiated at the time when the connection is authorized, which typically would be represented by successful payment or credentials being provided to the Wi-Fi network authorizing or guaranteeing payment. A user of the host device 102 may then initiate VPN connectivity. As noted in background section above, in conventional practice initiating this VPN would prevent the hotspot access network from transmitting any administrative messages to the user, except in the case of split VPN tunneling (which is less and less common because of its security vulnerabilities).

According to this exemplary embodiment there is established a long-lived transport connection (TCP, UPD, SCTP or alike) using the link-local address of the host device 102 with the server 104-106. The host's link-local address may be derived from the MAC address or some other local identifier, or configured for the host device 102 via DHCP at the time of connection establishment. Alternatively the server 104-106 address may be discovered at the time of connection, such as for example using address resolution protocol ARP in the case of IPv4, or neighbor discovery in the case of IPv6. In a very particular embodiment for the case in which DHCP is to be used a new DHCP option may be specified to indicate the address of the server 104-106. The server 104-106 itself is located on the local communication link to which the host device 102 is attached, and is the node of the access network where the local communication link terminates.

The VPN connection that is established between the host device 102 and the enterprise VPN gateway 110 uses the IPv4 or IPv6 address, which is globally routable. The IPv4 address may be a private IPv4 address, but regardless it is used by the host device 102 as the end-point address of the VPN connection. This is made possible through the use of network address translation, or NAT.

The local transport connection using the link-local address is not affected by the presence or absence of any VPN connection, and this is true regardless of whether split tunneling is enabled or not. The server 104-106 keeps track of the lifetime of the connection through the Wi-Fi hotspot/ AP 104. When the expiry of the connection is near, the server 104-106 sends an administrative message over the local transport connection, such as a TCP, UPD, SCTP or the like, previously established by the host device 102 to the server 104-106 using the link-local address. In this case the host device 102 needs to know the port number of the server to which it has to establish the long-lived TCP or other type of transport connection. In various exemplary embodiments, this may be a well known default port number defined within the Hotspot group; or it may be a port which the host device 102 learns through DHCP; or it may be a port which is the access network sends to the host device 102 via layer 2 signaling.

When the server 104-106 needs to send a message to the host device 102, it uses the long-lived TCP or other type of transport connection that was established earlier by the host device 102 with the node or server. Delivery of the message to the host device 102 causes, for example, a pop-up window to appear on a graphical display interface of the host device 102. This pop-up window provides information such as connection lifetime expiration time and time remaining for the connection. Such notification would enable the user at the host device 102 to extend the connection time, such as by purchasing additional time or otherwise extending or renewing authorization, or alternatively to gracefully shut down the applications which are using the connection, to put them in offline mode, or at the least to recognize that the applications will be usable only in offline mode.

The ability to deliver such an administrative message to the user at the host device 102 even when the host device 102 has an ongoing VPN connection 120 improves the user experience because it prevents the disruption of connectivity and related software applications without warning. In one implementation of the first embodiment, it is the VPN client at the host device 102 that initiates the long lived TCP or other transport connection (or re-establishes it when the connection is dropped), and so the firewall in the VPN client will not block the messages sent by the server 104-106 since such administrative (or other insecure) messages are sent using the TCP or other existing transport connection that was initiated by the client VPN itself.

Figure 2:
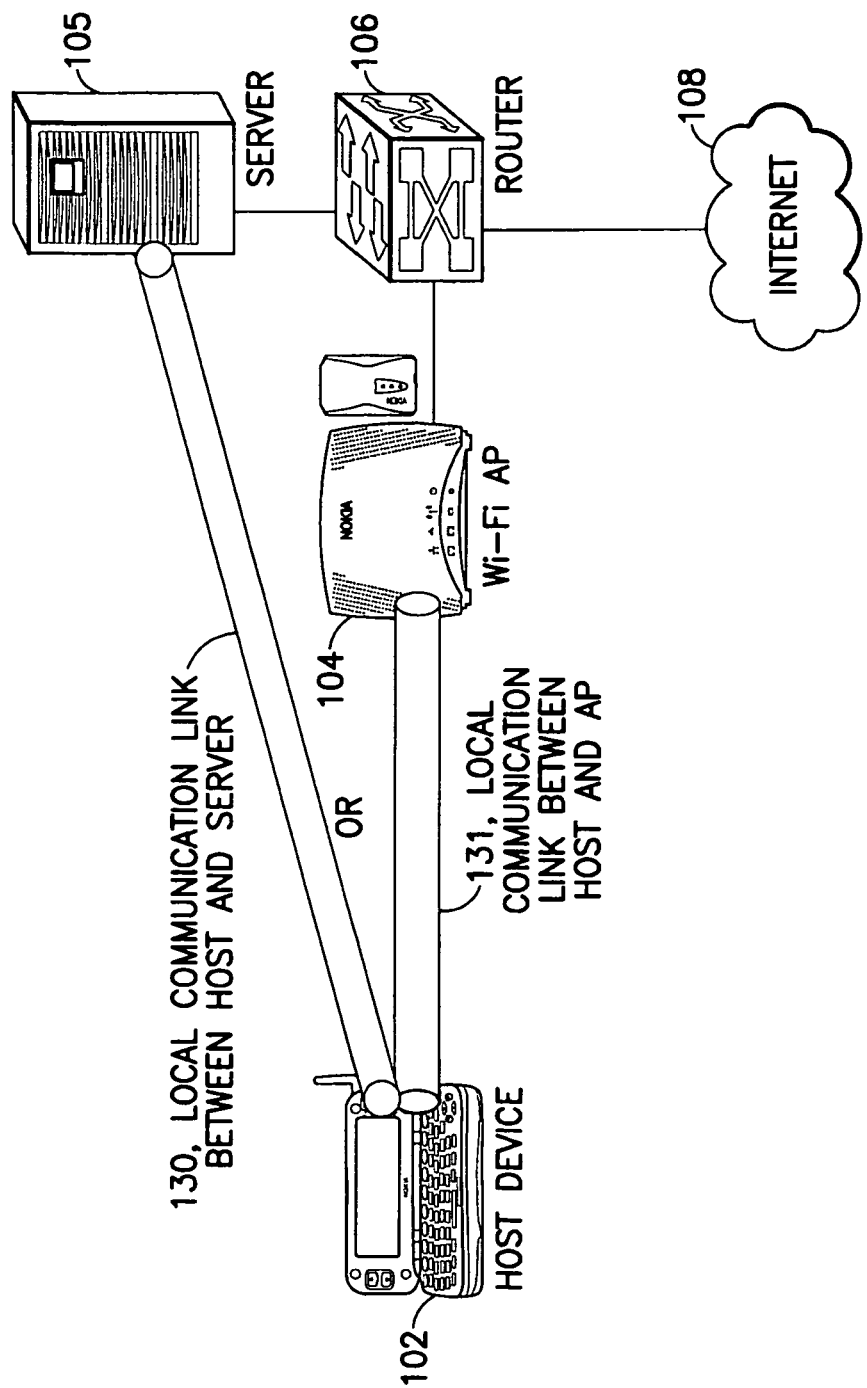
FIG. 2 is a schematic representation showing a local communication link between the host device and any of several nodes of an access network such as a Wi-Fi network.

FIG. 2 schematically illustrates various ways in which the local communication link may be set up. Shown are the host device 102, the AP 104, and a separate server 105 that is not co-located with the AP 104 or the router 106. Assume that the AP 104, router 106 and server 105 illustrated at FIG. 2 are all part of the Wi-Fi/WLAN access network. The enterprise network shown at FIG. 1 is accessible via the internet 108 but is not specifically shown at FIG. 2. For the case in which the local communication link terminates at the AP 104 itself, the local communication link is as shown by reference number 131 and the designated communication port associated with the network-side link-local address is at the AP 104.

For the case in which the local communication link terminates at some server 105 separate from the AP 104 (but still lying within the access/Wi-Fi network), the local communication link is as shown by reference number 130, and the designated communication port associated with the network side link-local address is at the server 105. In this latter instance the local link still passes through the AP 104 and router 106, although this specific detail is not shown in FIG. 2 for simplicity of illustration. The AP 104 and router 106 in this case act simply as switches and do not originate the administrative messages to the host device 102.

Regardless of which node of the access network in FIG. 2 is the one at which the local communication link terminates, if there is a VPN connection it is routed as shown at FIG. 1, the VPN tunnel passes through the AP 104 and may or may not pass through the server 105 and/or router 106 if such a server or router is not co-located with the AP 104.

Figure 3:
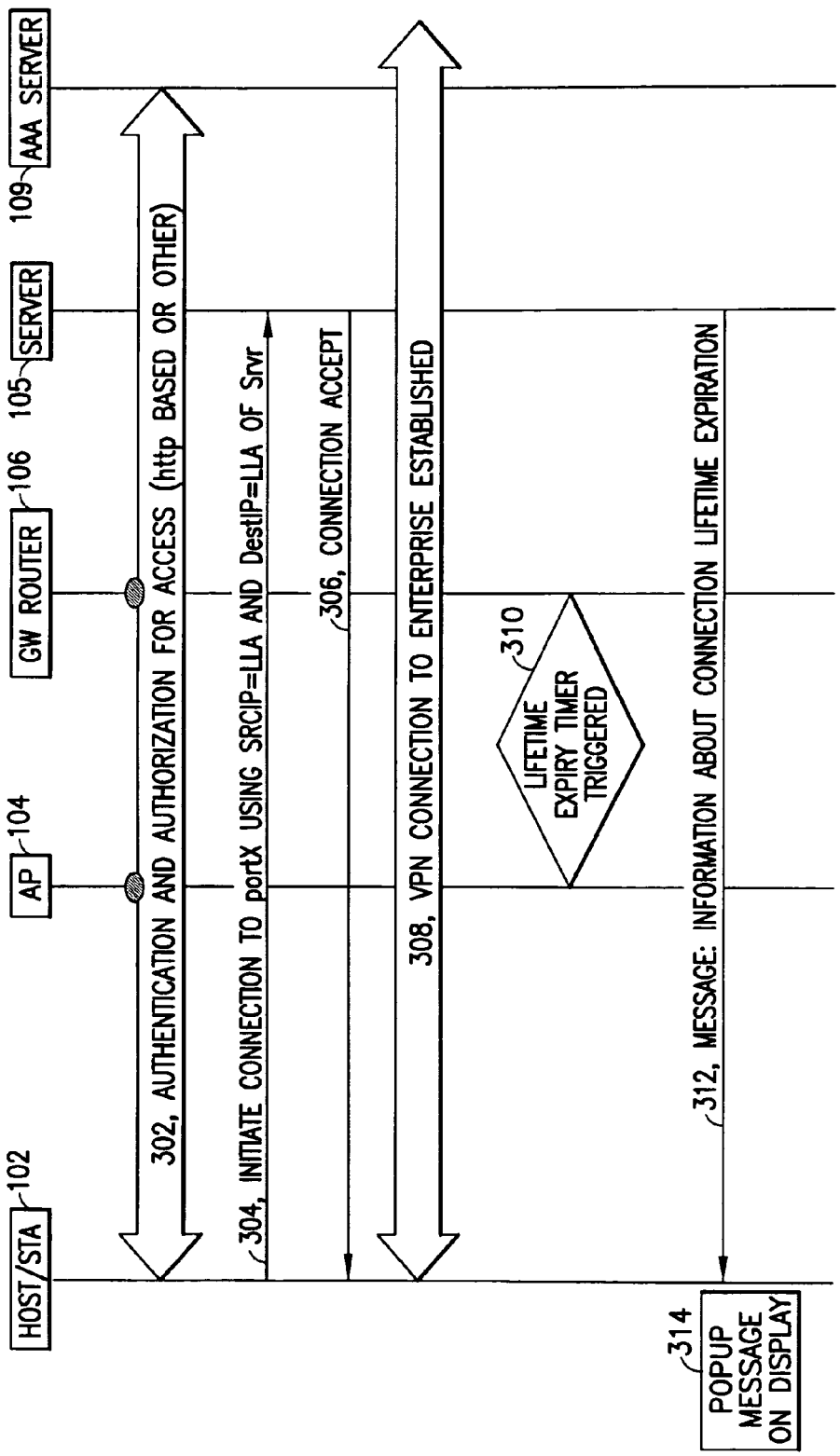
FIG. 3 is a signaling diagram to set up the local link of FIG. 2 and the VPN connection of FIG. 1 according to an exemplary embodiment of the invention.

FIG. 3 is a signaling diagram illustrating setup of the local communication link of FIG. 2 and of the VPN connection of FIG. 1. The nodes shown at FIG. 3 are those illustrated at FIG. 2 but with the addition of an authentication server 109 at FIG. 3 that operates to verify that payment has been made or that additional or alternative conditions have been met for access by the host device 102 to the internet 108 via the AP 104.

The message 302 is an exchange by which the host device 102 selects a time period for internet access via the access network and provides to that access network a credit card authorization or other verification of payment or authority. The AAA server 109 may verify this information and keep it secure from other nodes in the access network.

The message 304 illustrates exchanges taking place once conditions for access have been met. The host device 102 initiates a connection to communication port number X using the link-local address of the node at which the local link terminates, such as the server 105, the AP 104, or the router 106. The host device 102 knows or discovers this port number X through appropriate mechanisms, such as by selection of a default port, DHCP, or layer 2 signaling, as detailed above.

In return, the server 105 sends a connection accept message 306 back to the host device/station 102. At this juncture the local communication link has been established between the host device 102 and the server 105 of the access network.

Next the host device 102 decides to initiate a VPN connection at message exchange 308. Such initiation is done conventionally with the enterprise network for which the host device 102 has an appropriate username and digital authentication keys. At some point during the time the VPN connection is ongoing, the timer 310 monitored by the access point for the access network is triggered. Such triggering may be set to occur at any desired time, but one suitable time may be in the range of 10-15 minutes before the expiration of the time authorized in the message exchange 302.

In response to expiration of the timer 310, the server 105 sends a timeout warning message 312 to the host device 102 over the local link that was set up by messages 304 and 306. The message 312 provides information warning that the authorized time will shortly expire. This message 312 is sent even while the VPN connection 308 is ongoing.

In some embodiments, certain of the nodes that are shown separately at FIG. 3 may be combined into the AP 104 or some other node depending on the specific configuration of the access network.

According an exemplary embodiment falling within the second category described above, there is defined an indication at the link layer to indicate whether the AP supports notifications. This indication may be explicit or implicit. For example, an implicit indication of such support may be an indication by the AP hotspot 104 signifying that it is "Hotspot 2.0" compliant. From this indication, the host device 102 may recognize that the AP hotspot supports notifications, or more generally that the access network supports simultaneous local link and VPN connections to the same host device, where the local link can be used for notification delivery/receipt. The host device 102 may then use Layer 2 procedures, such as may be defined in WFA according to these teachings, to identify for the server 104-106 communication ports of the host device communication ports that are designated for the local communication link. Once the host device 102 has recognized that the AP device 104 supports notifications and identified the designated port for use in the local communication link, the host device 102 sets up a listening socket on this designated port. In one exemplary embodiment, this designated port at the host device 102 may be randomly selected, because there may be expected to be little likelihood of port conflicts at the host device side of the local link. The reason for this is that the host device 102 is unlikely to be using that designated communication port which has been associated with the link-local address for some other pre-existing session.

The host device 102 generates a link-local address for its own use, for example through ARP or neighbor discovery as noted above. The particular choice of mechanism to be used to generate the link-local address may depend at least in part on the IP address family to be used. The host device 102 suitably uses this generated link-local address to learn the server's 104-106 link-local address.

The host device 102 then sets up its listening socket on the link-local address and the designated communication port that has previously been established. The server 104-106 can then push any message it has to send, such as the timeout warning message described above, or an advertisement message, to the host device 102. In one exemplary embodiment of the invention, the message may be sent in a UDP packet. In a second exemplary embodiment of the invention, the server 104-106 may establish a TCP or other transport connection, such as an SCTP connection, to the host device 102, and then send the message as a TCP data frame.

In one frequently occurring case in which various embodiments of the invention may be employed, a non-IPsec firewall will be operating in the host device 102. This firewall may, for example, be configured via link layer signaling to open the port number which is designated for the local communication link. As noted above, in one exemplary embodiment of the invention, the port may be identified for the server 104-106 during layer 2 signaling of the link-local address association phase. In one embodiment, the host device 102 may create a rule in its firewall to allow the receipt of messages directed to the designated host device port that originate from the server's link-local address.

For example, and assuming the AP 104 is the network-side termination of the local link, such a rule might take the form: ALLOW (my link_local_address, my_local_port, AP_link_local_address, AP_any port_any_protocol).

Two considerations are of particular relevance for such an exemplary rule in the second category of embodiments. First, the specific identity of the port designated at the server is of little or no relevance. What is important is only that the message originate from the server's transport address and that the message arrive at or state the communication port of the host device 102 that is designated for the local communication link. The 'any protocol' designation in the above example rule allows the firewall to pass both TCP and UDP messages, giving the server 104-106 more options for the form which the administrative message may take. Second, it is noteworthy that this rule has nothing to do with the filtering on the VPN interface. As noted above, all filtering on the secure VPN link is handled by the IPSec engine of the host device 102 for the duration of the VPN connection, and messages arriving on the transport layer connection bypass that IP Sec engine.

The case in which the established VPN connection does allow split-tunneling is similar, except in this case there is a portion of the VPN tunnel whose messages are not decrypted by the IPsec engine. Messages arriving on that non-secure portion of the VPN tunnel may be handled conventionally, and in this specific instance the local communication link may be considered to be in parallel with the secure and the non-secure portions of the VPN split tunnel. The local communication link may be considered a second pathway for administrative messages directed to the host device 102 in addition to the non-secure portion of the VPN split tunnel.

For the first or second categories of embodiments noted above, consider the case in which the host device is mobile and needs to handover from a first access network to a second access network. Various specific embodiments falling into the above first and second categories are accomplished with the first access network, and the local link is a first local link. In order to maintain the VPN tunnel across the handover, the host device 102 would typically need to accept the terms and conditions of the second access network before the second access network would allow Internet access to the host device.

In such specific embodiments of the invention, a second local link may be set up between the host device 102 and the second access network over which the host device 102 can accept the terms and conditions. The VPN tunnel may then be switched from being routed to the host device through the first access network to being routed to the host device through the second access network at the handover, without having to break down and then re-establish the VPN tunnel. New TCP addresses are used for the second local link, and the port numbers may or may not be the same as those used for the first local link even though the first local link is dropped after the handover.

More specifically, in a scenario according to one embodiment of the invention, the Mobile IP software client in a host device such as the host device 102 sets up a secure tunnel with a Home Agent in the place of the VPN-GW 110 of FIG. 1 or elsewhere within the enterprise network 112. The Mobile IP needs to send what is known as a binding update to the Home Agent to register the new IP address for the host device 102 with the Home Agent. The new IP address for the host device 102 is assigned by the second access network, but the second access network typically blocks traffic to the new IP address until after its terms and conditions are accepted by the host device. Such blocking may be performed via the second local link. In the meantime, the VPN tunnel may be maintained through the first access network until it can be switched over. Similarly to the acceptance of the terms and conditions, in one embodiment the login or online sign-up of the host device with the second access network is also done over the second local communication link because the allocated new IP address is bound to the VPN tunnel in the above example.

According to embodiments falling within the third category, the local communication link uses IP addresses associated with ports rather than with transport layer addresses such as TCP addresses. The IP address is globally routable, so there is no need for address translation regardless of whether the address in question is a public or private IP address. The host device 102 may establish a long-lived transport connection, such as TCP, UDP, SCTP and the like, with a known port of the server 104-106, or a port discovered using a mechanism such as using ADP, neighbor discovery, or DHCP. As a further alternative, the host device may open a listening socket on the port signaled to it by the server 104-106 at the link layer association phase.

In this third category of embodiments, however, there is no IP address available for the host device 102 to use for a separate VPN connection because there is a host device port that is associated with the host device's IP address. In this instance, then, there would be no capacity for the host device 102 to receive a timeout warning or other insecure message if it instead set up a VPN connection using that same IP address used on the transport layer.

This third category of embodiments is more advantageous for host devices 102 which are not set up with a VPN client and therefore cannot set up a VPN connection anyway. There are many such user devices that may be employed as host devices such as the host device 102, and embodiments within this third category enable a more streamlined procedure for the server 104-106 to serve a variety of host devices with only minimally different procedures; associating either transport or IP addresses with designated ports for the local link and only translating addresses for the cases in which transport addresses are used.

There are additional security considerations since various exemplary embodiments falling within the above first and second categories may be designed so as to be fully functional even when there is a simultaneous VPN connection. It is expected that APs serving in the role of hotspots capable of supporting simultaneous transport layer links and secure VPN links to the same user device will be designed so as to provide information allowing a host device 102 to verify the identity of the hotspot before the host device associated with the hotspot. One mechanism by which this is expected to be accomplished is for the AP to send a beacon indicating it is 'hotspot 2.0 compliant'. This or other such explicit or implicit indication is interpreted by the host device 102 that this access network is capable of supporting simultaneous transport layer links and secure VPN links to the same user device. In this manner the host device 102 is able to verify the identity of the hotspot 2.0 compliant server 104-106. Such an approach keeps any additional security concerns to a minimum since by these teachings the server's identity is verified via the beacon/broadcast before the host device 102 associates with the server.

Similarly, there should be few additional security concerns for the case in which the host device 102 cannot verify the identity of the server 104-106 until after associating to the hotspot/AP 104, since verification will still occur prior to establishing the transport layer/local communication link and VPN connection (if any) as detailed in the above embodiments.

As an additional security feature, the local communication link and the VPN link should not be established for the case in which the host device 102 cannot verify the identity of the hotspot AP 104. But for the case in which the AP's identity is verified the host device 102 then trusts the access point 104 whether the device sets up a VPN connection or not.

Technical advantages of certain of the above exemplary embodiments include significant improvement of the user experience, since disruption to connectivity without any warning is prevented even when VPN connectivity is enabled and in use. Additional technical advantages include that the Wi-Fi hotspot service provider has a way to send administrative messages to the user through the use of link-local addresses, with any added security issues are limited because the scope of the transport layer connection used for such administrative messages is limited to the local link and does not implicate the VPN connection (if one is set up).

Figure 4:
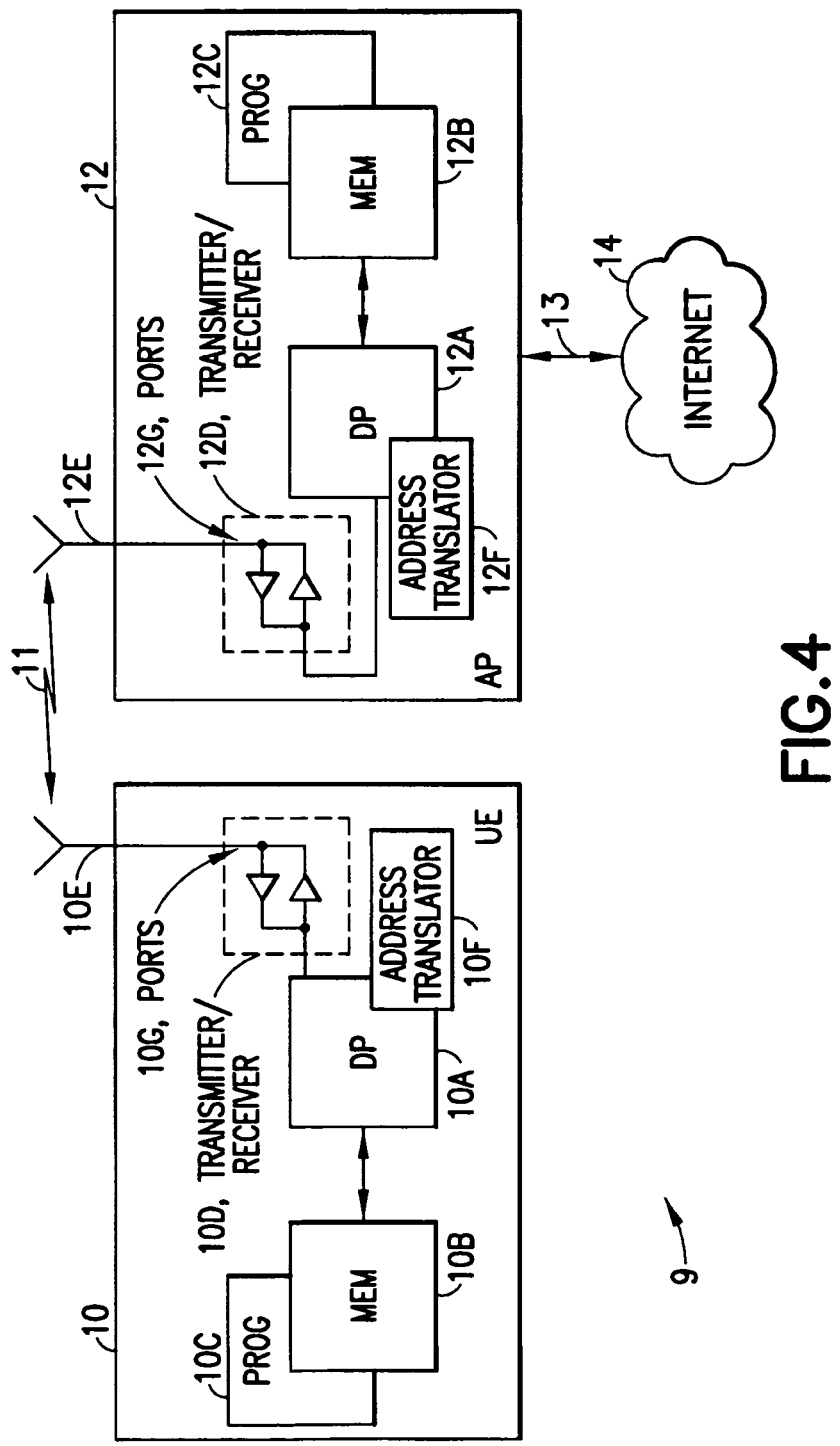
FIG. 4 is a high level block diagram of various devices used in carrying out various aspects of the invention.

Reference is now made to FIG. 4 for illustrating a simplified block diagram of various electronic devices that are suitable for use in practicing the exemplary embodiments of this invention. In FIG. 4 a wireless access network 9 is adapted for communication between a UE 10 in the position of the user/host device 102 or non-AP station (for an implementation specific to wireless local access networks) via an access point 12 or other access node of an access network. The network 9 may include a higher controlling node (not shown, by non-limiting example a gateway GW, a user plane entity UPE, a mobility management entity MME, or a system architecture evolution gateway SAE-GW) as well as the router 106 and server 105 illustrated at FIG. 2. For the case in which the server 105 or router 106 is not co-located with the AP 104, such a server or router have similar functional blocks as shown at FIG. 4 for the AP 104 but may or may not have the wireless transmitter and receiver 12D and instead have only a modem coupled to the ports 12G. For simplicity the AP 12 is shown as directly interfacing to the Internet though the different arrangements of FIGS. 1-2 may be present.

The UE 10 includes a data processor (DP) 10A, a memory (MEM) 10B that stores a program (PROG) 10C, and a suitable radio frequency (RF) transmitter and receiver 10D coupled to one or more antennas 10E for bidirectional wireless communications over a data link 13 with the AP 12. Within the data link 13 are the local communication link and the VPN connection noted in detail above. The AP 12 also includes a DP 12A, a MEM 12B that stores a PROG 12C, and a suitable RF transmitter and receiver 12D coupled to one or more antennas 12E. The AP 12 may be coupled via a data path 13 to the internet or other broader communication network. Also at the UE 10 and the AP 12 is an address translator 10F, 12F for translating between IP addresses and transport layer addresses, such as TCP, UDP, SCTP similar addresses, for example, as detailed above for the first and second categories of embodiments. Ports 10G and 12G are shown generally to indicate the communication ports designated for the local link as described for the three example embodiments detailed above.

At least one of the PROGs 10C and 12C is assumed to include program instructions that, when executed by the associated DP, enable the electronic device to operate in accordance with the exemplary embodiments of this invention as was detailed above in detail.

In general, the exemplary embodiments of this invention may be implemented by computer software executable by the DP 10A of the UE 10 and the other DPs, or by hardware, or by a combination of software and/or firmware and hardware. The interactions between the major logical elements should be obvious to those skilled in the art for the level of detail needed to gain an understanding of the broader aspects of the invention beyond only the specific examples herein. It should be noted that the invention may be implemented with an application specific integrated circuit ASIC, a field programmable gated array FPGA, a digital signal processor or other suitable processor to carry out the intended function of the invention, including a central processor, a random access memory RAM, read only memory ROM, and communication ports for communicating between the AP 12 and the UE 10 as detailed above.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor based memory devices, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multi-core processor architecture, as non-limiting examples.

At least one of the memories is assumed to tangibly embody software program instructions that, when executed by the associated processor, enable the electronic device to operate in accordance with the exemplary embodiments of this invention, as detailed by example above. As such, the exemplary embodiments of this invention may be implemented at least in part by computer software executable by the controller/DP of the network element 12 or UE 10, or by hardware, or by a combination of software and hardware.

Figure 5:
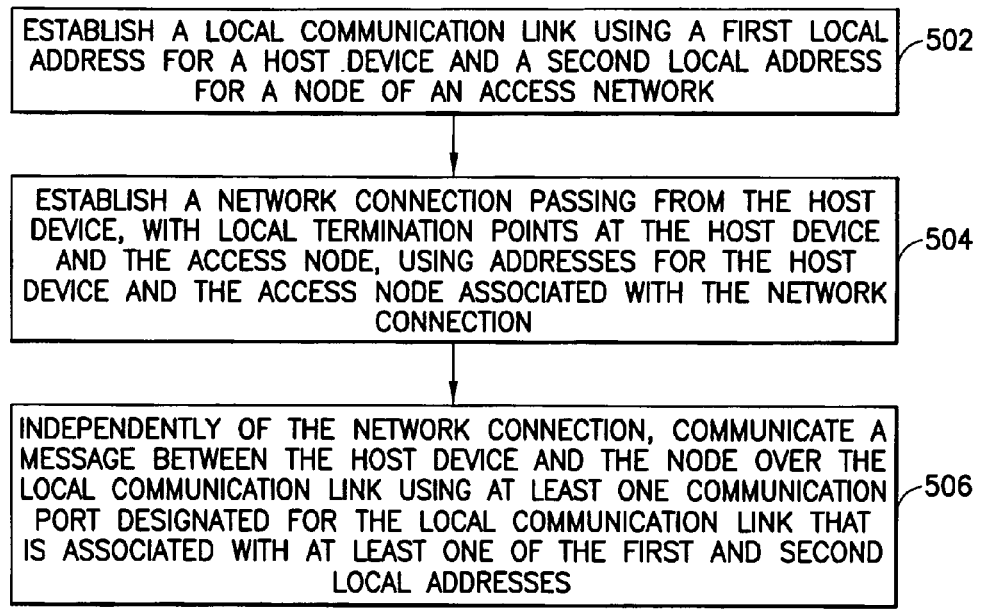
FIG. 5 is a process flow diagram showing actions taken by a device or in response to executing an embodied software program according to an exemplary embodiment of the invention.

Based on the foregoing it should be apparent that exemplary embodiments of the present invention provide a method for performing operations such as those shown at FIG. 5. In other embodiments there is an apparatus, such as either of those shown at FIG. 4, which includes at least one processor and at least one memory storing computer program code in which the processor and memory storing the code are configured to cause the apparatus to perform the actions set forth at FIG. 5. In other embodiments there is at least one computer readable memory tangibly storing a computer program that when executed by a processor cause actions comprising those shown at FIG. 5.

More specifically, block 502 of FIG. 5 shows actions comprising establishing a local communication link between a host device such as the host device 102 and a node of an access network, such as the node represented by one or more of the devices 104-106. The local communication link may suitably employ local addresses for the host device 102 and the node, with the local addresses being associated with the local communication link. Establishing the link may, in one exemplary implementation, occur immediately after connecting to the access network.

Block 504 shows actions comprising establishing a network connection passing from the host device and through the access network. The network connection suitably has local termination points at the host device and the access node, and allows the host device to communicate with devices beyond the access point. The network connection suitably uses addresses for the host device and the access node that are associated with the network connection.

Block 506 shows the actions of communicating a message between the host device and the node over a local communication link such as the local communication link 130 between the host device 102 and the server 105, the local communication link 131 between the host device 102 and the Wi-Fi AP 104, or another suitable local communication link. The message may be communicated using at least one communication port that is designated for the local communication link and that is associated with at least one of the first and second local addresses. Communication of the message is suitably independent of any network communication link, secure or otherwise, terminating at the host device and passing through the access network.

The actions represented at FIG. 5 may encompass numerous implementations and variations, some of which have been detailed above and are not illustrated in FIG. 5 to avoid redundancy. Some of these variations, which may occur individually, or may be combined, as desired, may include:

establishing a secure communication link between the host device and a gateway of a virtual private network through the access network while the local communication link of block 502 is active, in which the secure communication link is parallel to the local communication link;

the message communicated at block 506 comprises a timeout warning message indicating an amount of time remaining after which at least one of the secure connection link noted immediately above or internet connectivity will expire unless action is taken at the host device;

the message communicated at block 506 comprises an advertisement;

handing over the host device to a second access network without interrupting the secure communication link by accepting terms and conditions of the second access network via a second local communication link that is established between the host device and the second access network;

the local communication link of block 502 comprises a transport layer connection such as TCP, UDP, SCTP and the like, and the local addresses are transport addresses;

establishing the local communication link at block 502 occurs after the host device attaches to the wireless access network and occurs in response to a determination by the host device that the access network supports notification delivery. Such a determination may be informed by an explicit indication from the access network, and may indicate a capability by the access network to support, for example, parallel secure and local links with a single host device. The indication may comprise an indication by a beacon signal transmitted by the access node or other device that the access network is notification delivery compliant.

According to one or more embodiments falling within the first category detailed above, whether or not including any one or more of the above variations, the designated communication port of block 506 is on the node of the access network and is associated with the second local address and the actions further comprise any of: using layer 2 signaling to inform the host device of the designated communication port of the node; or the host device; using DHCP to discover the designated communication port of the node; or using as the designated communication port a default port of the node that is known a priori to the host device. The host device and the node can discover one another's port number and IP address via DHCP, neighbor discovery, or ARP as noted in detail above.

According to one or more embodiments falling within the second category detailed above, whether or not including any of the above variations, the designated communication port of block 506 is on the host device and is associated with the first local address, and the actions further comprise any of: using layer 2 signaling to inform the node of the designated communication port; use by the node of layer 2 signaling to instruct the host device of the designated communication port to which the host device should listen for notifications; or the use by the node using DHCP to discover the designated communication port of the host device; or the designated communication port is a default port that is known a priori to the node. In a particular embodiment falling within this second category the communication port is dynamic and the host device configures the dynamic communication port as a listening socket for insecure messages. As is true of various embodiments falling within the first category, also in embodiments falling within the second category the host device and node can discover one another's port number and IP address also via DHCP, neighbor discovery, or ARP as noted in detail above.

Now in one or more embodiments falling within the third exemplary category detailed above, after a host device is attached to a node of an access network which indicates that the access network supports notification delivery there is a designated communication port through which notifications are communicated between the host device and the node of the access network, characterized by at least one of: the host device sets up a listening socket on the designated port which is on the host device (such as using approaches specified above for embodiments falling within the first and second categories) or the host device learns the designated port which is on the node (such as using approaches specified above for embodiments falling within the first and second categories). A connection is set up using that designated port and a notification message is sent over the connection. In specific various implementations for embodiments falling within this third category at least one of the following may be implemented: the designated communication port is on the host device and is associated with an Internet protocol address of the host device; and/or the designated communication port is on the node of the access network and is associated with an Internet protocol address of the node.

In a more specific variation of the embodiment summarized immediately above, there is the further action of using either of: layer 2 signaling to inform at least one of the host device and the node of the access network which port is associated with the Internet protocol address; discovering the designated port using DHCP, or using a default port that is known a priori as the designated port.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block and signaling diagrams, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
    establishing a local communication link between a host device and a node of an access network using, for establishing the local communication link, internet protocol addresses for the host device and for the node of the access network that are selected for use with the local communication link and assigned, respectively, to the host device and the node of the access network;
    establishing a network communication link passing from the host device and through the access network using addresses for the host device and for the node of the access network that are associated with the network communication link passing through the access network; and
    during ongoing communication between the host device and the access network over the network communication link, communicating a message between the host device and the node over the local communication link, wherein communicating the message between the host device and the node is independent of the network communication link, wherein the message is an administrative message related to one or more of availability of and conditions for access by a user device to the access network,
    wherein the local communication link is one of:
    a link between the host device and a port of the access network used for delivery of notifications to a user device;
    a link to a port designated by the host device and identified by the access network to the host device; and
    a link to a globally routable internet protocol address associated with a designated port of the access network.

2. The method according to claim 1, wherein the network communication link is a secure communication link providing connectivity between the host device and a gateway of a virtual private network through the access network.

3. The method according to claim 1, wherein the network communication link is parallel to the local communication link.

4. The method according to claim 1, wherein the message comprises a timeout warning message indicating that a service provided in association with the access network will terminate.

5. The method according to claim 1, wherein the access network is a first access network and the local communication link is a first local communication link, further comprising handing over by the host device to a second access network without interrupting the secure communication link, and wherein handing over comprises communication with the second access network via a second local communication link that is established between the host device and the second access network.

6. The method according to claim 1, wherein the message comprises an advertisement.

7. The method according to claim 1, in which the local communication link is a transport layer connection.

8. The method according to claim 7, wherein the addresses that are associated with the local communication link are link-local IP addresses.

9. The method according to claim 7, wherein a listening socket for receiving notifications is established at a designated port of the host device.

10. The method according to claim 1, wherein the addresses associated with the local connection are globally routable IP addresses.

11. An apparatus comprising:
at least one processor;
at least one memory storing computer program code;
wherein the memory and the computer program code are configured to, with the at least one processor, cause the apparatus to:
establish a local connection link to an access node of an access network using, for establishing the local communication link, internet protocol addresses for the apparatus and for the access node that are selected for use with with the local connection link and assigned, respectively, to the host device and the node of the access network;
establish a secure connection link passing from the apparatus and through the access network using addresses for the host device and for the node of the access network that are associated with a network communication link passing through the access network; and
during ongoing communication between the host device and the access network over the network communication link, send to or receive from the node a message over the local communication link, wherein communicating the message between the host device and the node is independent of the secure communication link, wherein the message is an administrative message related to one or more of availability of and conditions for access by a user device to the access network wherein the local communication link is one of:
a link between the host device and a port of the access network used for delivery of notifications to a user device;
a link to a port designated by the host device and identified by the access network to the host device; and
a link to a globally routable internet protocol address associated with a designated port of the access network.

12. The apparatus of claim 11, wherein the memory and the computer program code are further configured to, with the processor, cause the apparatus to establish a designated port of the apparatus to send or receive the message.

13. The apparatus of claim 12, wherein the memory and the computer program code are further configured to, with the processor, cause the apparatus to notify the access node of the identity of the designated port.

14. The apparatus of claim 11, wherein the memory and the computer program code are further configured to, with the processor, cause the apparatus to establish the local connection link in response to an explicit indication from the access network that the access network is able to deliver notifications over a local connection link independently of a secure communication link.

15. The apparatus of claim 14, wherein the explicit indication comprises a broadcast message.

16. A non-transitory computer readable medium storing a program of instructions, execution of which by a processor causes an apparatus to perform actions comprising:
establishing a local communication link between a host device and a node of an access network using, for establishing the local communication link, internet protocol addresses for the host device and for the node of the access network that are selected for use with the local communication link and assigned, respectively, to the host device and the node of the access network;
establishing a network communication link passing from the host device and through the access network using addresses for the host device and for the node of the access network that are associated with the network communication link passing through the access network; and
during ongoing communication between the host device and the access network over the network communication link, communicating a message between the host device and the node over the local communication link, wherein the message is an administrative message related to one or more of availability of and conditions for access by a user device to the access network, wherein communicating the message between the host device and the node is independent of the network communication link, wherein the local communication link is one of:
a link between the host device and a port of the access network used for delivery of notifications to a user device;
a link to a port designated by the host device and identified by the access network to the host device; and
a link to a globally routable internet protocol address associated with a designated port of the access network.

17. The computer readable medium according to claim 16, wherein the network communication link is a secure communication link providing connectivity between the host device and a gateway of a virtual private network through the access network.

18. The computer readable medium according to claim 16, wherein the message comprises a timeout warning message indicating that a service provided in association with the access network will terminate.

19. The computer readable medium according to claim 16, wherein the access network is a first access network and the local communication link is a first local communication link, further comprising handing over by the host device to a second access network without interrupting the secure communication link, and wherein handing over comprises communication with the second access network via a second local communication link that is established between the host device and the second access network.

20. The computer readable medium according to claim 16, in which the local communication link is a transport layer connection.

* * * * *